US007673509B2

(12) United States Patent
Cochran

(10) Patent No.: US 7,673,509 B2
(45) Date of Patent: Mar. 9, 2010

(54) MAGNETICALLY COUPLED DRIVE FOR A SEALED LIQUID LEVEL SENDER

(75) Inventor: Gary D. Cochran, 2870 Page Ave., Ann Arbor, MI (US) 48104

(73) Assignees: Rudolph Bergsma Trust, Ann Arbor, MI (US); Gary D. Cochran, Ann Arbor, MI (US)

( * ) Notice: Subject to any disclaimer, the term of this patent is extended or adjusted under 35 U.S.C. 154(b) by 349 days.

(21) Appl. No.: 11/649,509

(22) Filed: Jan. 4, 2007

(65) Prior Publication Data
US 2007/0151337 A1 Jul. 5, 2007

Related U.S. Application Data

(60) Provisional application No. 60/756,151, filed on Jan. 4, 2006.

(51) Int. Cl.
*G01F 23/30* (2006.01)
(52) U.S. Cl. .............................................. 73/311
(58) Field of Classification Search ............... 73/290 R, 73/305, 306, 308, 314, 322.5
See application file for complete search history.

(56) References Cited

U.S. PATENT DOCUMENTS

| 1,847,006 | A | * | 2/1932 | Kalischer | ..................... 310/104 |
| 2,726,296 | A | | 12/1955 | Hanson et al. | |
| 2,870,284 | A | | 1/1959 | Oliveau | |
| 2,974,313 | A | | 3/1961 | Parker | |
| 3,449,955 | A | | 6/1969 | Stadelmann | |
| 3,644,763 | A | * | 2/1972 | Skrobisch | ..................... 310/36 |
| 3,731,805 | A | | 5/1973 | Schmiers | |
| 3,739,641 | A | | 6/1973 | Taylor et al. | |
| 3,925,747 | A | | 12/1975 | Woodward et al. | |
| 4,025,237 | A | * | 5/1977 | French | ..................... 417/131 |
| 4,056,979 | A | * | 11/1977 | Bongort et al. | ............... 73/313 |
| 4,229,973 | A | | 10/1980 | Hara | |
| 4,532,491 | A | | 7/1985 | Rau et al. | |
| 4,557,144 | A | | 12/1985 | Lucchini | |

(Continued)

FOREIGN PATENT DOCUMENTS

BR   PI 9202351-7 A   1/1994

OTHER PUBLICATIONS

SAE Technical Paper 2002-01-1074 entitled "Design Guidelines for Automotive Fuel Level Sensors" by E. F. Smith, III of J.M. Ney and Hugh Ireland.

*Primary Examiner*—Hezron Williams
*Assistant Examiner*—Alex Devito
(74) *Attorney, Agent, or Firm*—George L. Boller

(57) ABSTRACT

The internal movement of one embodiment of a sealed fuel level sender employs two magnets disposed diametrically opposite each other about a pivot. The actuator that is operated by in-tank fuel level has two magnets disposed diametrically opposite each other about the axis with one pole of each magnet of the actuator confronting an opposite pole of a respective magnet of the movement to provide the magnetic coupling for causing the movement to follow the fuel level while minimizing, and preferably substantially eliminating, cross thrust on the pivot. Pole pieces may be associated with the magnets in a further embodiment. Still another embodiment employs magnets to only one side of the pivot, but with pole pieces that reduce cross thrust.

20 Claims, 4 Drawing Sheets

U.S. PATENT DOCUMENTS

| | | |
|---|---|---|
| 4,679,580 A | 7/1987 | Devall et al. |
| 4,920,797 A | 5/1990 | Swartz et al. |
| 4,924,704 A | 5/1990 | Gaston |
| 4,939,932 A | 7/1990 | Ritzenthaler et al. |
| 4,987,400 A | 1/1991 | Fekete |
| 5,085,078 A | 2/1992 | Baux et al. |
| 5,150,615 A | 9/1992 | Rymut et al. |
| 5,284,055 A | 2/1994 | Baux et al. |
| 5,301,550 A | 4/1994 | Shortis |
| 5,341,679 A | 8/1994 | Walkowski et al. |
| 5,357,815 A | 10/1994 | Williamson |
| 5,367,416 A * | 11/1994 | Cossette et al. .......... 360/97.02 |
| 5,375,467 A | 12/1994 | Banse |
| 5,431,047 A | 7/1995 | Coha et al. |
| 5,442,865 A | 8/1995 | Wallrafen |
| 5,746,088 A | 5/1998 | Sawert et al. |
| 5,798,640 A | 8/1998 | Gier et al. |
| 5,814,830 A | 9/1998 | Crowne |
| 6,014,958 A | 1/2000 | Miwa et al. |
| 6,041,650 A | 3/2000 | Swindler et al. |
| 6,070,337 A | 6/2000 | Wallrafen |
| 6,089,086 A | 7/2000 | Swindler et al. |
| 6,209,392 B1 | 4/2001 | Rapala |
| 6,260,543 B1 | 7/2001 | Chih |
| 6,298,540 B1 | 10/2001 | Benjey et al. |
| 6,401,533 B1 | 6/2002 | Gier et al. |
| 6,453,741 B1 | 9/2002 | Beck, II |
| 6,488,015 B2 | 12/2002 | Isobe |
| 6,494,226 B2 | 12/2002 | Tipton et al. |
| 6,564,632 B2 | 5/2003 | Ross, Jr. |
| 6,571,978 B1 | 6/2003 | Puempel et al. |
| 6,588,288 B1 | 7/2003 | Swindler |
| 6,658,934 B1 | 12/2003 | Housey et al. |
| 6,803,759 B2 | 10/2004 | Eck et al. |
| 2004/0261525 A1 * | 12/2004 | Chen .......................... 73/313 |

* cited by examiner

MAGNETICALLY COUPLED DRIVE FOR A SEALED LIQUID LEVEL SENDER

REFERENCE TO A RELATED APPLICATION AND PRIORITY CLAIM

This application claims the priority of provisional patent application No. 60/756,151, filed Jan. 4, 2006.

TECHNICAL FIELD OF THE INVENTION

The present invention is directed to the field of devices whose operating drive function depends upon magnetic coupling between a driven component and a follower component, the two components coupled solely by a magnetic field. In particular, the invention relates to float-operated senders that are associated with fuel tanks of motor vehicles to transmit a value of a parameter representing the level of liquid fuel in a tank to instrumentation that uses the value to operate a display that presents information related to the level of fuel in the tank to a driver of the vehicle, applied to a sealed fuel level sender with a sweep of less than 180 angular degrees.

BACKGROUND OF THE INVENTION

Recent development of a fuel level sender with a resistor card inside a sealed chamber is described in U.S. Pat. No. 6,851,315, by Bergsma et al. Fuel and/or fuel vapor is prevented from entering the chamber, eliminating deleterious chemical interaction between fuel and materials of the sender card, e.g. silver and/or silver alloys. A driving source on the outside of the chamber comprises either a ferrous pole or a magnet magnetically coupled with a magnet inside the chamber, or a magnet coupled with ferrous material inside the chamber for turning a fan inside the chamber without physical contact with the drive source. The chamber has a non-magnetic wall separating the inside of the sealed chamber from the outside, and the wall is free of any hole or intrusion (except where one or more electric terminals protrude through in a sealed manner that maintains sealing of the chamber interior from liquid fuel and fuel vapor), and with no requirement for dynamic sealing of a rotary shaft penetrating the chamber wall to couple a driving source to an internal component. Cost and technical complexity of a shaft seal have prevented its use in a high-volume, low-cost, application such as an in-tank fuel level sender in a mass-produced motor vehicle. Magnetically coupled devices are well known for isolating a component such as a pumping blade in a liquid pump from an outside environment.

One of the earliest inventions for a magnetically coupled drive is U.S. Pat. No. 1,847,006, by Kalischer, 1932, followed by many other related inventions: U.S. Pat. No. 2,460,015, by Jones; U.S. Pat. No. 4,163,164 by Pieters; U.S. Pat. No. 5,090,944 by Kyo et al.; and more recently U.S. Pat. No. 6,417,591 by Saito, et al. and U.S. Pat. No. 6,908,291 by Klein, et al. The use of magnets and ferrous materials both internally and externally to provide a rotary magnetically coupled drive is well known to those skilled-in-the-art.

Torque generated by a magnetically coupled drive is a key specification parameter. The number of magnets, the material, the air gaps, and the flux closure paths are all important in a drive design. A most important design goal of a magnetically coupled drive is that its magnets and poles are aligned one-for-one between the inside and outside of the chamber. The wall thickness of the chamber has a major effect on the permissible air gap between the magnetic poles. The environment both inside and outside the chamber may determine the type of magnetic materials that can be used, as corrosion and chemical effects may affect one material versus another. Size and volume limitations for the device may limit the size and number of magnetic sources and flux closure paths. Some systems are designed with a single magnet on the outside of the chamber wall and a single magnet on the inside, both to one side of a pivot. Flux closure elements may not be part of the design.

A magnetic drive for external reading of a liquid level in a tank, the gauge sealed only against elements of the weather, is described in U.S. Pat. No. 6,089,086, by Swindler, et al., 2000. U.S. Pat. No. 6,564,632, by Ross, Jr., 2002 describes a hermetic gauge, again sealed only against the atmospheric environment. It should be noted that U.S. Pat. No. 6,089,086 limits its use of a magnetically coupled gauge to a gauge environment external to a tank; the gauge is not designed to be used in a tank with materials designed for sealing against liquids and vapor in the tank. In fact, the proposed magnetic structure is not desirable; it leads to a strong pull along the shaft length of the rotating axis. The cylindrical magnet and the pointer magnet are disposed at different axial distances from the tank or pointer, on opposite sides of a wall perpendicular to the axis of rotation. They pull at each other along the axial direction, creating significant friction in the bearing assembly including the pointer. A better arrangement is magnets positioned radially around ring structures both internally and externally. This prevents axial thrust. U.S. Pat. No. 6,417, 591 reads, "Moreover, because force produced between the first magnet group and the second magnet group acts in the radial direction, but not in the thrust direction, there is no likelihood that bearings, etc. will be damaged by the force." However, an unbalanced arrangement of magnets may also produce cross-thrusts that causes significant friction effects leading to incorrect angular positioning of the pointer assembly.

SUMMARY OF THE INVENTION

The inventor believes that the addition of one or more flux closure elements to a magnetically operated, hermetically sealed, limited sweep in-tank fuel level sensor can provide a significant increase in torque that is important for improving performance and useful life of such a sensor. The inventor further believes that it is desirable to minimize, and preferably substantially eliminate, both axial thrust and radial cross-thrust on bearings or shafts in such sensors.

A magnetically coupled drive disposed within a fuel tank is designed with a substantially zero cross-thrust across a rotational pivot point. Although a mechanical force such as a spring can be used to balance a cross-thrust caused by a magnetic force, emphasis in this disclosure is on symmetrical magnetic fields to substantially reduce cross-thrust. Magnets and/or ferrous materials are placed on both sides of a pivot point, substantially canceling the forces along three orthogonal coordinate directions passing through said pivot point. It's not necessary that geometrical symmetry be achieved for a sealed level sender, only a balance in cross forces, i.e. the distance from the pivot to a magnet field source on one side does not have to be the same as the distance from the pivot to a magnetic field on the opposite side. Furthermore, the geometrical arrangement does not develop thrust along the length direction of the rotation axle. In effect, there is a developed torque, with no net force trying to move the driven device in any direction other than a rotational one.

In order to develop as high a torque as possible for a limited sweep angle of rotation, pole pieces are provided with ferrous and/or magnetic materials to aid in magnetic path closure, equivalent to a reduction in air gaps between magnetic poles. Various embodiments of flux closure pole pieces are described.

DETAILED DESCRIPTION OF THE INVENTION

Figure 1A:
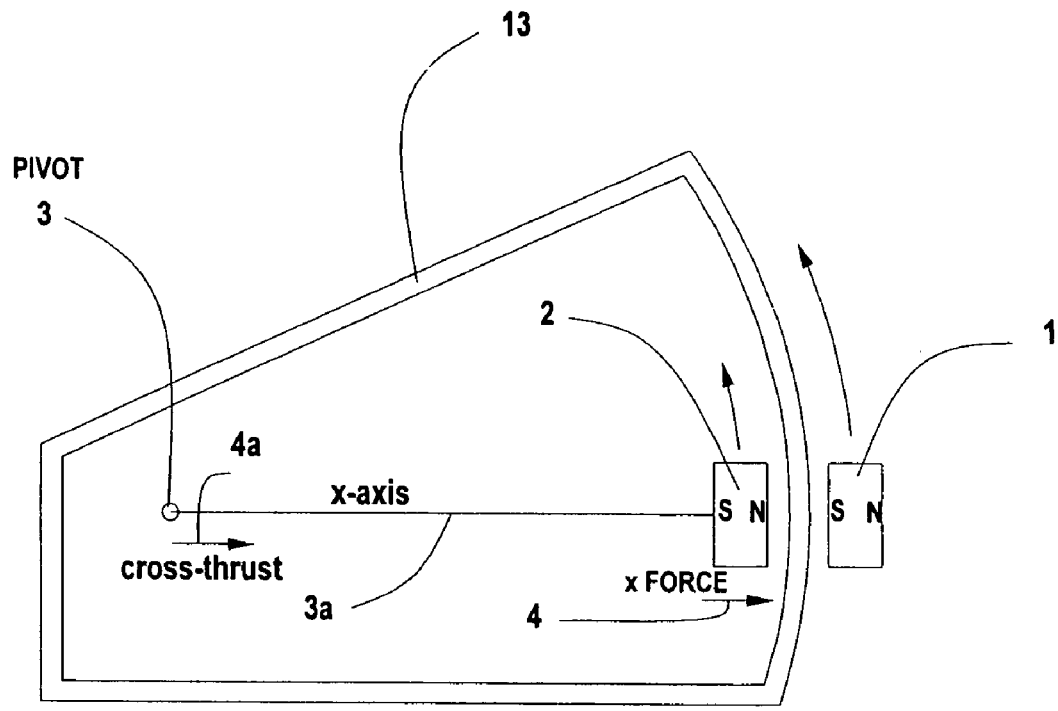
FIGS. 1a and 1b are prior art cross section views of an asymmetrical drive design causing cross-thrust on a pivot point.

FIG. 1a shows a prior art design. It's highly asymmetrical and gives rise to a large cross-thrust 4a on an axle, or shaft, at the pivot point 3. Magnet 1 is the driving magnet and magnet 2 is the driven magnet. An axle, not shown, passes through the pivot point in the vertical direction with respect to the drawing sheet, and magnet 2 is connected to the axle by a rod 3a or mounting assembly from pivot 3 to magnet 1. This is shown along the x-axis. A cross-thrust force of 0.5 lbs is easily attained with magnets 1 and 2 made of Neodymium Iron Boron (NEO) in typical design geometries. This can be very stressful on the axle pivot point, causing a shortened lifetime and increased friction. Also, the magnets do not have any flux closure paths, leading to a non-optimum torque with large air gaps. The interior of a sealed chamber is isolated from the outer environment by a closed wall 13, including front and back walls, not shown. At least the portion of wall 13 between the magnets must be non-magnetic in order for the magnetic field(s) to pass through the wall, and provide the magnetic coupling. This sealed chamber will not be shown on any of the subsequent drawings, but will be assumed to be present in all cases. Also assumed to be present inside the chamber, although not shown, are a wiper that is part of the movement inside the chamber and that wipes across a resistor card track as magnet 2 is positioned by magnet 1 to turn the axle, and electric terminals that pass through the chamber wall to connect to an electrical connector on the exterior for connecting the potentiometer formed by the wiper and resistor track to an electrical system of a motor vehicle. The float and float arm that position the driving magnet and/or driving ferrous part on the exterior of the chamber circumferentially about the chamber in accordance with liquid fuel level in the tank are also not shown, but are understood to be present. The chamber material must be chosen and the wall must be designed to provide an hermetic seal against the chemicals in the outer environment. What is appropriate for a simple hermetic seal against the weather such as rain and air, is not sufficient for sealing against tank fuels and fuel vapors.

Figure 1B:
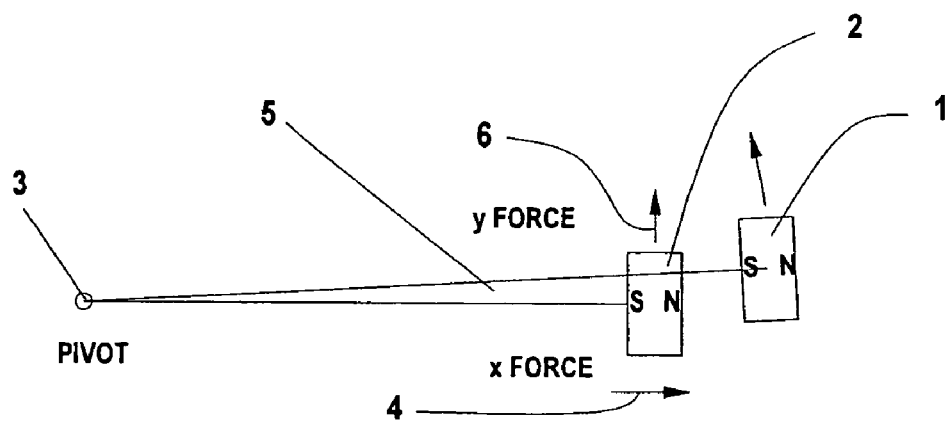

FIG. 1b shows the same arrangement as FIG. 1a with the drive magnet rotated through a small angle in a counter-clockwise (CCW) direction. The resultant force on magnet 2 now includes a y-component in addition to the x-component force. This leads to a torque whereby magnet 2 tries to follow magnet 1 in rotation about the common pivot 3. The net cross-thrust force changes direction slightly, since it's now made up of two magnetic vectors in the x and y directions.

Figure 2A:
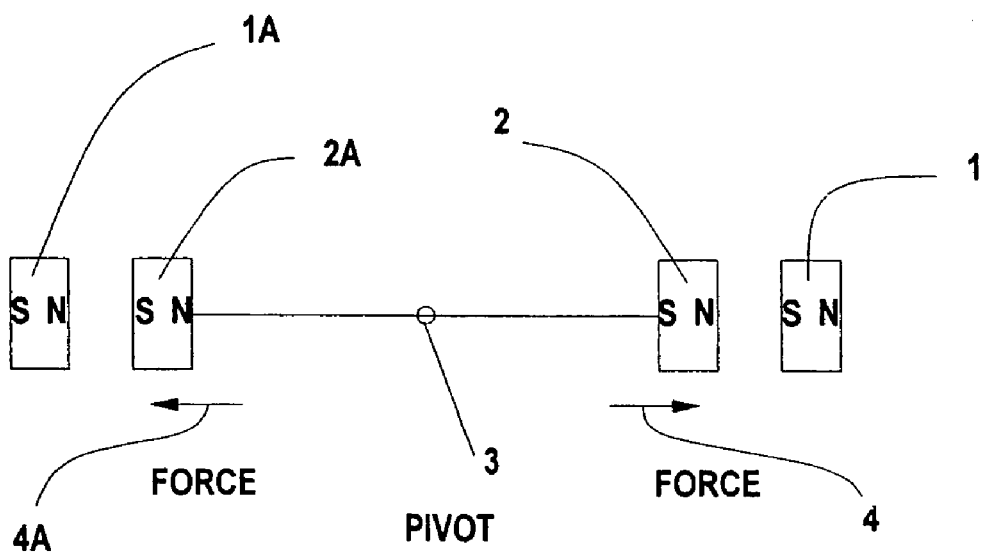
FIGS. 2a and 2b show a geometrically symmetric arrangement that eliminates the cross-thrust along a line connecting the magnets without reducing the torque caused by forces perpendicular to the line.

FIG. 2a shows an embodiment for disposition in a fuel tank that results in zero or little cross-thrust on pivot 3 along a line between magnets 2 and 2a. Magnets or magnetic poles are placed on both sides of pivot 3, balancing the cross-thrust on a line passing through the pivot point axle. The direction of magnetization of any collinear magnets or poles on one side of the pivot are in the same direction. The magnets or poles on the opposite side do not have to match this direction. However, it may be convenient to do so. The important point is to have the force along a line through the pivot from one side balanced with an equal force from the other side.

Figure 2B:
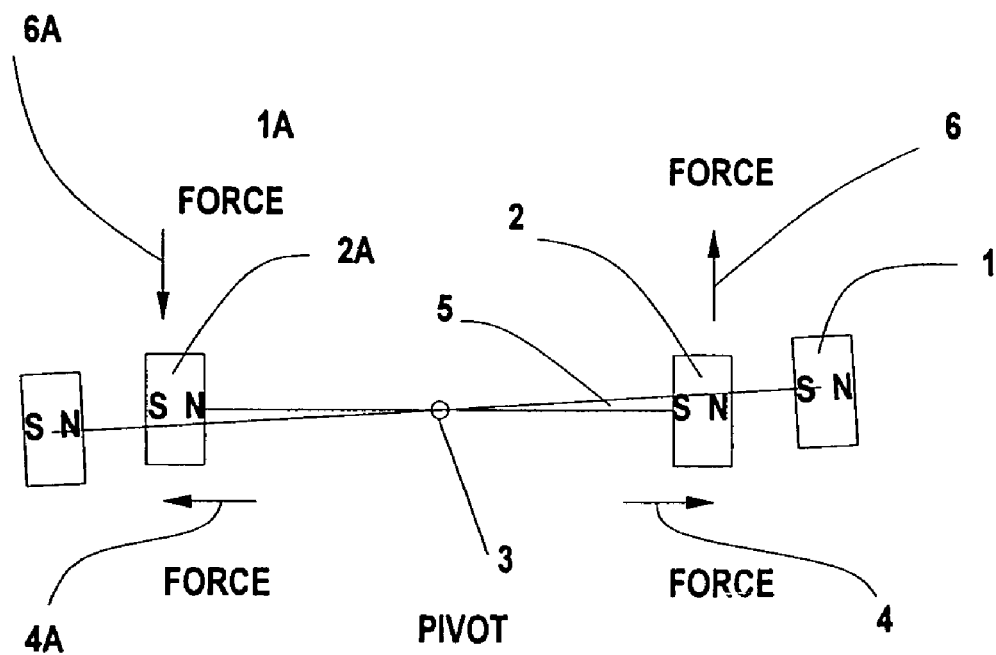

FIG. 2b shows the same embodiment as FIG. 2a with a small angular rotation of magnet 1. Although there is now a y-component of force on magnet 2, an equal and opposite component occurs on magnet 2A. Therefore, no net y-component of force is developed, and the equilibrium of forces is retained, even though the assembly with magnets 2 and 2A now experience a torque.

Figure 3A:
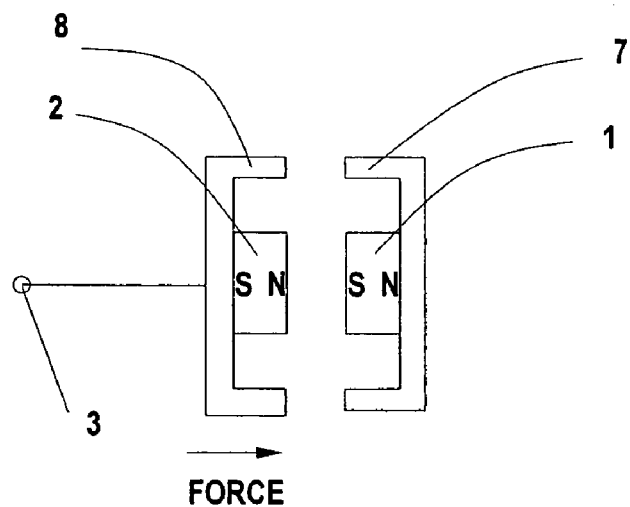
FIG. 3a shows a single-sided improvement in flux closure with higher torque, but with cross-thrust still being developed.

FIG. 3a shows a significant improvement in flux closure, retaining the original, asymmetrical design with cross-thrust. This may be acceptable for some designs, provided the bearing at pivot 3 can handle the cross-thrust. Flux closure components 7 and 8, made of ferrous materials, greatly shorten the distance from flux exiting from the opposite sides of magnets 1 and 2. The flux from the back (radially outer) side of magnet 1, a north pole, must loop around and terminate on its own front face, a south pole, but also interact with the poles of magnet 2. This interaction is the only way the magnetic field from magnet 1 can exert a force on magnet 2. The magnetic flux emitted from the ends of ferrous component 7 originates at the north pole face of magnet 1 and only has to pass over to the confronting ends of ferrous component 8 for termination on the south pole of magnet 2, although some flux also passes from the ends of component 7 directly to the south face of magnet 1. Even one pole piece, say pole piece 7 alone without pole piece 8, will improve the torque when magnet 1 and pole piece 7 are rotated about pivot 3. However, the use of both pole pieces is preferred.

Figure 3B:
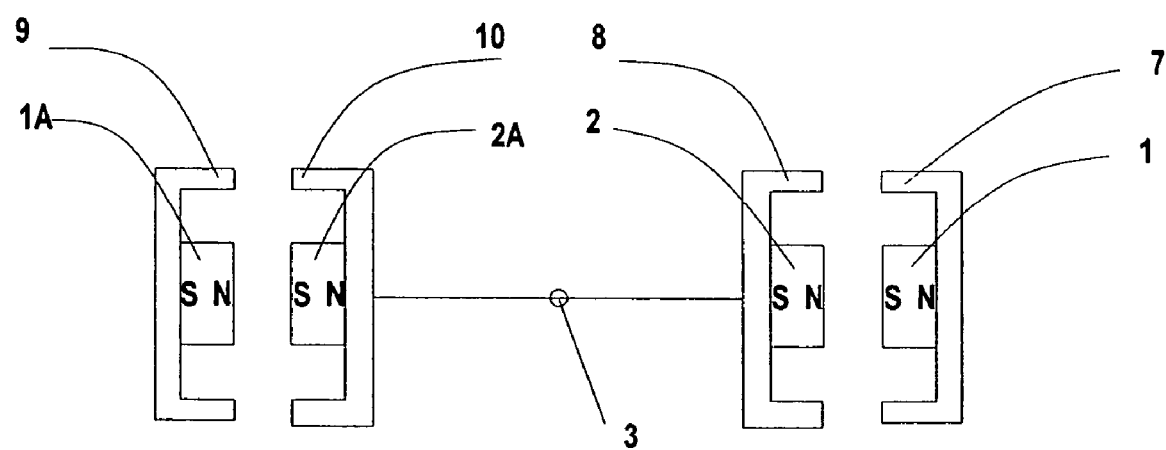
FIG. 3b shows a symmetrical system with flux closure pole pieces.

FIG. 3b shows an embodiment of the invention with cross-thrust reduced, and torque increased. The pivot is centered, and the magnetic circuit is symmetrical on either side of the pivot. The same arguments apply as made in describing FIG. 2b. The addition of pole pieces 9 and 10 equalizes the cross-forces exerted by the magnets and pole pieces on the opposite sides of the pivot.

Figure 4:
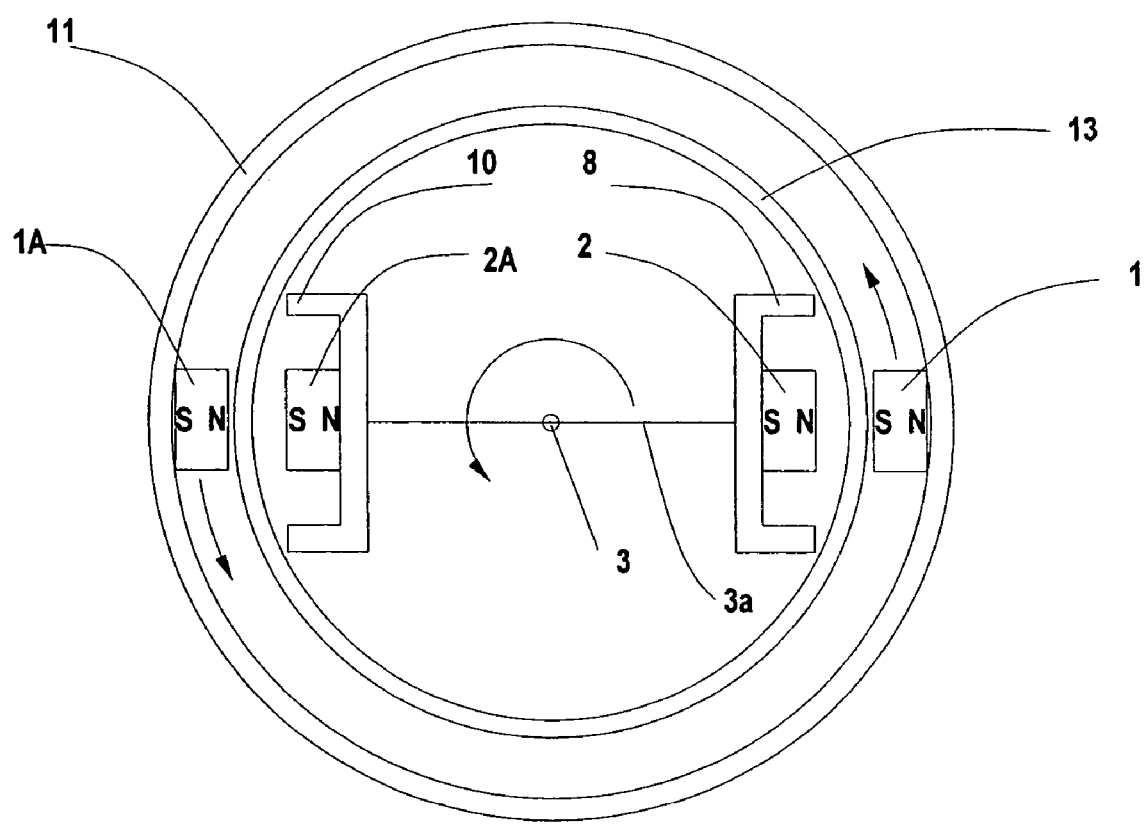
FIG. 4 shows a zero cross-thrust system with a different flux closure design.

FIG. 4 shows an embodiment whereby magnets 1 and 1A are attached to a ferrous component 11 that provides a flux path from one pole of magnet 1 to the opposite pole of magnet 1A. This is only possible if all of the magnets are magnetized in the same direction, not just on one side of the pivot. Although this improves the flux closure by reducing the distance from component 11 to each of the pole pieces 8 and 10 it's not as efficient as shown in FIG. 3b. In fact, the major contribution to a torque increase occurs because the air gap from the back side of each interior magnet is decreased because of the proximity of the pole piece to the nearest inside surface of the ferrous outer rim.

What is claimed is:

1. A fuel level sender that is disposed within a tank for holding volatile liquid fuel to signal the level of volatile liquid fuel in the tank, the sender comprising:

an enclosure providing an interior that is sealed against intrusion of both liquid fuel and fuel vapor;

an actuator that is external to the enclosure and that is positionable in correlation with the level of liquid fuel in the tank in a circumferential sense relative to the enclosure about an imaginary axis passing through the enclosure;

a movement that is disposed within the interior of the enclosure and that is positionable circumferentially about the axis in correspondence with the positioning of the actuator about the axis relative to the enclosure via magnetic coupling of the movement to the actuator through the enclosure; and an electric circuit element disposed within the interior of the enclosure and operated by the movement to electrically signal the liquid fuel level;

wherein the movement comprises two magnets disposed diametrically opposite each other about the axis, the actuator comprises two magnets disposed diametrically opposite each other about the axis, and one pole of each magnet of the actuator confronts an opposite pole of a respective magnet of the movement to provide the magnetic coupling from magnetic forces i) that act between the one pole of each magnet of the actuator and the opposite pole of the respective magnet of the movement, ii) that are substantially radial to the axis, and iii) that when the actuator is displaced circumferentially by a change in liquid level create torque components that impart circumferential motion to the movement.

2. A fuel level sender as set forth in claim 1 wherein the magnets are constructed and arranged such that magnetic coupling between one of the actuator magnets and the respective movement magnet creates a radial force between them that substantially cancels a radial force between the other actuator magnet and the other movement magnet.

3. A fuel level sender as set forth in claim 2 wherein the one pole of the one actuator magnet has one polarity, and the one pole of the other actuator magnet has a polarity opposite that of the one pole of the one actuator magnet.

4. A fuel level sender as set forth in claim 1 wherein each magnet comprises opposite polarity end faces that face in opposite directions along a radial to the axis.

5. A fuel level sender as set forth in claim 4 further comprising a magnetic flux conductor associated with an end face of one magnet of one pair of confronting magnets that faces opposite an end face that confronts the other magnet of the one pair and a magnetic flux conductor associated with an end face of one magnet of the other pair of confronting magnets that faces opposite an end face that confronts the other magnet of the other pair, wherein the magnetic flux conductors comprise respective end faces at respective locations that are spaced circumferentially of the confronting end faces of the respective pair of magnets and respective flux return paths from the magnet end faces with which they are respectively associated to their respective end faces.

6. A fuel level sender as set forth in claim 5 wherein each magnetic flux conductor comprises two such end faces disposed in circumferentially opposite directions of the confronting end faces of the respective pair of magnets.

7. A fuel level sender as set forth in claim 5 wherein one magnetic flux conductor conducts return magnetic flux from a pole of one polarity and the other magnetic flux conductor conducts return magnetic flux from a pole of opposite polarity.

8. A fuel level sender as set forth in claim 5 wherein each magnetic flux conductor is associated with a respective one of the actuator magnets.

9. A fuel level sender as set forth in claim 5 wherein each magnetic flux conductor is associated with a respective one of the movement magnets.

10. A fuel level sender as set forth in claim 5 further comprising a further magnetic flux conductor associated with an end face of the other magnet of the one pair of confronting magnets that faces opposite an end face that confronts the one magnet of the one pair and a magnetic flux conductor associated with an end face of the other magnet of the other pair of confronting magnets that faces opposite an end face that confronts the one magnet of the other pair, wherein each further magnetic flux conductor comprises an end face that confronts the enclosure at a location where the end face of the magnetic flux conductor associated with the one magnet of the respective pair confronts the enclosure.

11. A fuel level sender as set forth in claim 10 wherein each magnetic flux conductor comprises two such end faces disposed in circumferentially opposite directions of the confronting end faces of the respective pair of magnets.

12. A fuel level sender as set forth in claim 11 wherein one further magnetic flux conductor conducts return magnetic flux from a pole of one polarity and the other further magnetic flux conductor conducts return magnetic flux from a pole of opposite polarity.

13. A fuel level sender as set forth in claim 1 wherein each magnet comprises opposite polarity end faces that face in opposite directions along a radial to the axis, the one pole of the one actuator magnet has one polarity, and the one pole of the other actuator magnet has a polarity opposite that of the one pole of the one actuator magnet, and further comprising a magnetic flux conductor associated with an end face of one magnet of one pair of confronting magnets that faces opposite an end face that confronts the other magnet of the one pair and a magnetic flux conductor associated with an end face of one magnet of the other pair of confronting magnets that faces opposite an end face that confronts the other magnet of the other pair, wherein the magnetic flux conductors comprise respective pairs of end faces at respective locations that are spaced circumferentially opposite of the confronting end faces of the respective pair of magnets and respective flux return paths from the magnet end faces with which they are respectively associated to their respective pairs of end faces, and a magnetic flux conductor ring disposed concentric with the axis for conducting magnetic flux between the end faces of the other magnets of each pair of magnets that are opposite the confronting faces of the respective pair of magnets.

14. A fuel level sender as set forth in claim 13 wherein the magnetic flux conductor ring is disposed on the actuator for conducting flux between the actuator magnets.

15. A fuel level sender that is disposed within a tank for holding volatile liquid fuel to signal the level of volatile liquid fuel in the tank, the sender comprising:

an enclosure providing an interior that is sealed against intrusion of both liquid fuel and fuel vapor;

an actuator that is external to the enclosure and that is positionable in correlation with the level of liquid fuel in the tank in a circumferential sense relative to the enclosure about an imaginary axis passing through the enclosure;

a movement that is disposed within the interior of the enclosure and that is positionable circumferentially about the axis in correspondence with the positioning of the actuator about the axis relative to the enclosure via magnetic coupling confronting magnets on the movement and on the actuator respectively;

a magnetic flux conductor that is associated with an end face of one magnet that faces opposite an end face that confronts an end face of the other magnet, the magnetic flux conductor comprising an end face that confronts the enclosure at a location that is spaced circumferentially of the confronting end faces of the magnets and a flux return path from the magnet end face with which the magnetic flux conductor is associated to the magnetic flux conductor's end face;

and an electric circuit element disposed within the interior of the enclosure and operated by the movement to electrically signal the liquid fuel level.

16. A fuel level sender as set forth in claim 15 wherein the magnetic flux conductor is associated with the movement magnet.

17. A fuel level sender as set forth in claim 15 wherein the magnetic flux conductor is associated with the actuator magnet.

18. A fuel level sender as set forth in claim 15 wherein the magnetic flux conductor comprises two such end faces disposed in circumferentially opposite directions of the confronting end faces of the magnets.

19. A fuel level sender as set forth in claim 15 further comprising a further magnetic flux conductor that is associated with an end face of the other magnet that faces opposite the end face that confronts the one magnet, the further magnetic flux conductor comprising an end face that confronts the end face of the magnetic flux conductor associated with the one magnet and a flux return path from the other magnet's end face with which the further magnetic flux conductor is associated to the further magnetic flux conductor's end face.

20. A fuel level sender as set forth in claim 19 wherein each magnetic flux conductor comprises two such end faces disposed in circumferentially opposite directions of the confronting end faces of the magnets.

* * * * *